United States Patent [19]

Hehl

[11] 3,973,888

[45] Aug. 10, 1976

[54] DIE CLOSING UNIT FOR INJECTION MOLDING MACHINE WITH MOLDING DIE HAVING MULTIPLE TRANSFER SECTIONS

[76] Inventor: Karl Hehl, Arthur-Hehl-Strasse 32, 7291 Lossburg, Germany

[22] Filed: May 6, 1975

[21] Appl. No.: 575,147

[30] Foreign Application Priority Data
May 22, 1974 Germany............................ 2424782
May 6, 1974 Germany............................ 2421811

[52] U.S. Cl. ............................ 425/125; 425/126 R; 425/129 R
[51] Int. Cl.² ...................... B29F 1/00; B29D 3/00
[58] Field of Search......... 425/125, 126, 129, 242 R, 425/246, 450.1, 451, 454; 164/332, 342

[56] References Cited
UNITED STATES PATENTS
3,079,632  3/1963  Peickii .......................... 425/126 X
3,661,490  5/1972  Trueblood ...................... 425/246 X FOREIGN PATENTS OR APPLICATIONS
1,311,191  10/1962  France ............................... 425/246
2,105,331  8/1972  Germany ........................... 425/451
201,991  2/1966  Sweden ............................... 425/129

*Primary Examiner*—Robert D. Baldwin
*Attorney, Agent, or Firm*—Joseph A. Geiger

[57] ABSTRACT

A die closing unit for injection molding machines producing articles with embedded insert parts, where the injection molding die includes several identical transfer sections which are movable between a closing station in alignment with the other die sections and a loading station in which the insert parts are placed into the transfer section of the die. A vertically movable die carrier, positioned just below the closing station, receives a transfer section of the die from a transfer station, as the transfer section is shifted horizontally into the closing station in a first embodiment, or lifted vertically into the closing station in a second embodiment. In each case, the transfer section thereby becomes independent of the transfer platen which moves the transfer sections between the transfer and loading stations.

16 Claims, 6 Drawing Figures

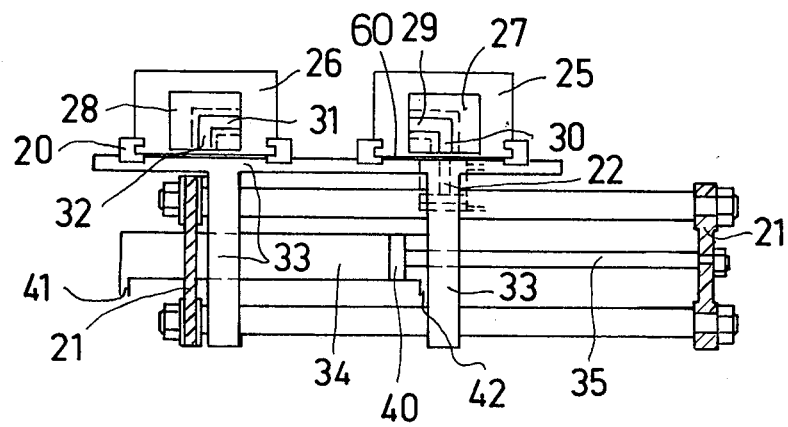
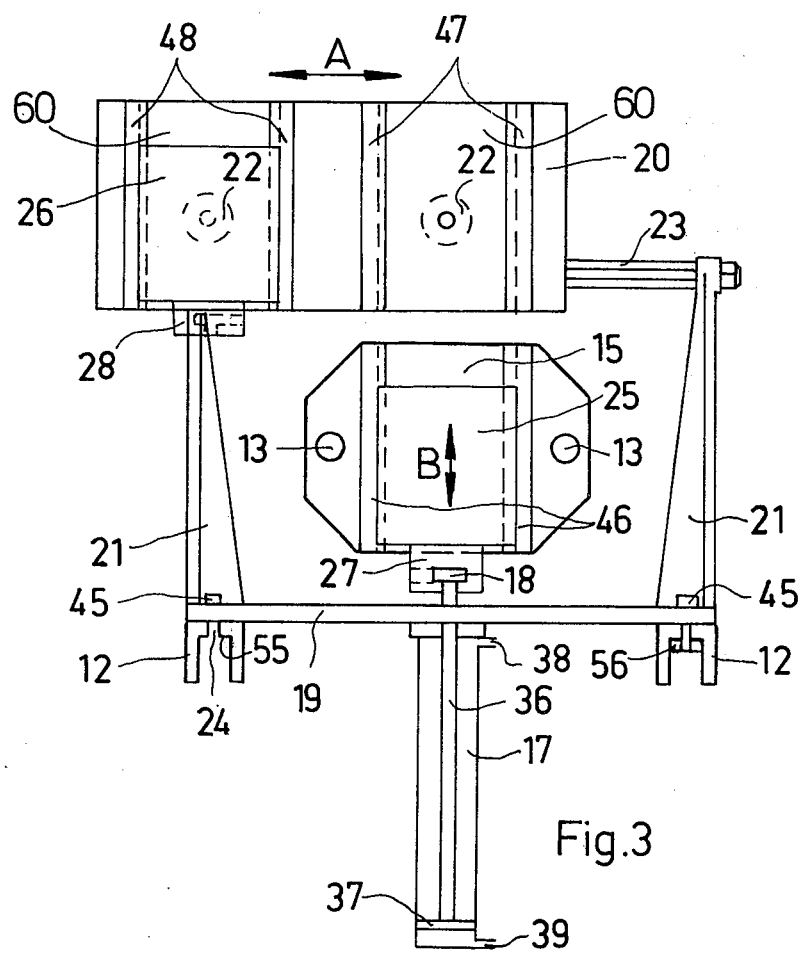

DIE CLOSING UNIT FOR INJECTION MOLDING MACHINE WITH MOLDING DIE HAVING MULTIPLE TRANSFER SECTIONS

BACKGROUND OF THE INVENTION

1. Field of the Invention

The present invention relates to injection molding machines and to die closing units for the latter, and more particularly to a die closing unit for an injection molding machine whose molding die has multiple transfer sections for the production of articles with embedded insert parts, whereby the transfer sections of the injection molding die are alternatingly removable from the open die for the placement thereinto of insert parts, as another transfer section is involved in an injection molding cycle.

2. Description of the Prior Art

The idea of devising the injection molding die of an injection molding machine to comprise at least two transversely interchangeable identical transfer sections is not new. A known version of such a die closing unit includes a transfer platen carrying the transfer sections of the injection molding die between a loading station located laterally outside the die closing unit itself and a closing station in which the transfer section is aligned with the other die section, or sections, for a closing motion by the die closing unit. In this case, however, the transfer platen itself is subjected to the closing pressure exerted by the die closing unit, meaning that the transfer platen has to be strong enough to withstand that closing pressure, which may reach many tons.

One shortcoming of this prior art arrangement is, accordingly, that the transfer platen has to be comparatively heavy. Since the prior art transfer platen in question is of the reciprocating type, moving along a straight line between a loading station and a closing station, the drive for this reciprocating motion must be correspondingly powerful, in order to overcome the high inertia of the massive transfer platen. On the other hand, the speed of the platen drive is limited, due to the fact that the mass of the moving parts, if stopped and started too rapidly, would create undesirable deflections and vibrations in various component parts of the die closing unit.

An additional shortcoming of this prior art structure relates to the fact that the transfer sections of the injection molding die are moved along a straight line into and out of the closing station, so that the respective loading stations have to be located on opposite sides of the closing station. This means that the operator in charge of placing insert parts into the transfer sections in the loading stations, is obliged to move from station to station on opposite sides of the die closing unit. Alternatively, a separate operator is required for each of the two loading stations.

SUMMARY OF THE INVENTION

Underlying the present invention is the primary objective of devising an improved die closing unit and die transfer mechanism of the earlier-mentioned type which does not have the indicated shortcomings, inasmuch as the transfer platen is not subjected to the closing force of the die closing unit during injection, so that the transfer platen can be made much lighter, for a higher rate of production, and the operator can conveniently reach both loading stations, or a single loading station for emplacement of the insert parts.

The present invention proposes to attain these objectives by suggesting an improved die closing unit and die transfer mechanism in which the transfer sections of the injection molding die are moved between three stations: a loading station in which the insert part, or parts, are placed into the transfer section, a transfer station located in the immediate vicinity of the movable die carrier, and a closing station defined by the movable die carrier. A transfer platen carries the transfer sections of the die, moving them between one or more loading stations and the transfer station. In a second motion, oriented substantially perpendicularly to the movement of the transfer platen, the transfer sections are alternatingly shifted between their transfer station on the transfer platen and a closing station on the movable die carrier, where the transfer section is no longer carried by the transfer platen, but by the movable die carrier itself. The vertically arranged die closing unit can now execute a regular die closing motion, followed by an injection cycle.

In one embodiment of the invention, the transfer platen executes a horizontal reciprocating motion linking two loading stations with a central transfer station, while a shifting cylinder executes a perpendicular horizontal motion, pulling a transfer section from the transfer station into the closing station on top of the movable die carrier.

In a second embodiment, the transfer platen takes the form of a rotating table carrying two or more transfer sections inside appropriate platen apertures which, when positioned above the movable die carrier, allow the latter to lift the transfer section from the platen in a shifting motion which is executed by the movable die carrier itself and which is part of the die closing motion.

In both cases, the transfer platen includes guide means for the shifting motion of the transfer sections between the transfer station and the closing station, which guide means are located outside the path of the movable die carrier. Both embodiments also have in common that the direction of the shifting motion between the transfer station and the closing station is perpendicular to the direction of the motion of the transfer platen carrying the transfer sections between the loading station and the transfer station.

BRIEF DESCRIPTION OF THE DRAWING

Further special features and advantages of the invention will become apparent from the description following below, when taken together with the accompanying drawings which illustrate, by way of examples, several embodiments of the invention, represented in the various figures as follows:

FIG. 3 shows the transfer mechanism of FIGS. 1 and 2 in a plan view;

FIG. 4 shows the transfer mechanism of FIG. 3 in an elevational view taken from behind the transfer platen;

DESCRIPTION OF THE PREFERRED EMBODIMENTS

Figure 1:
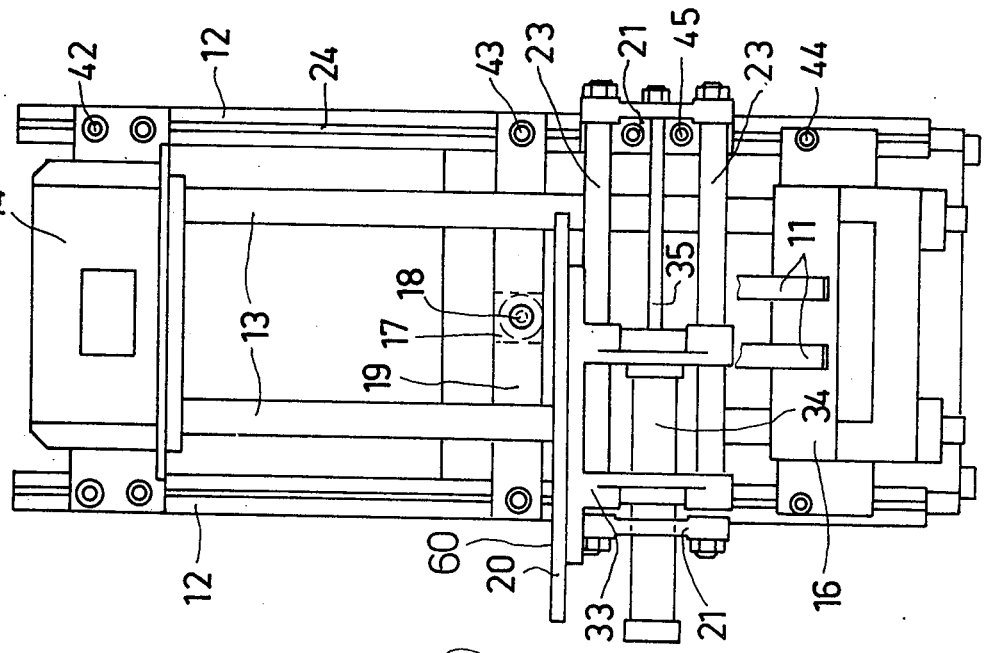
FIG. 1 shows in an elevational front end view a die closing unit and transfer mechanism for an injection molding machine, as a first embodiment of the invention.
Figure 2:
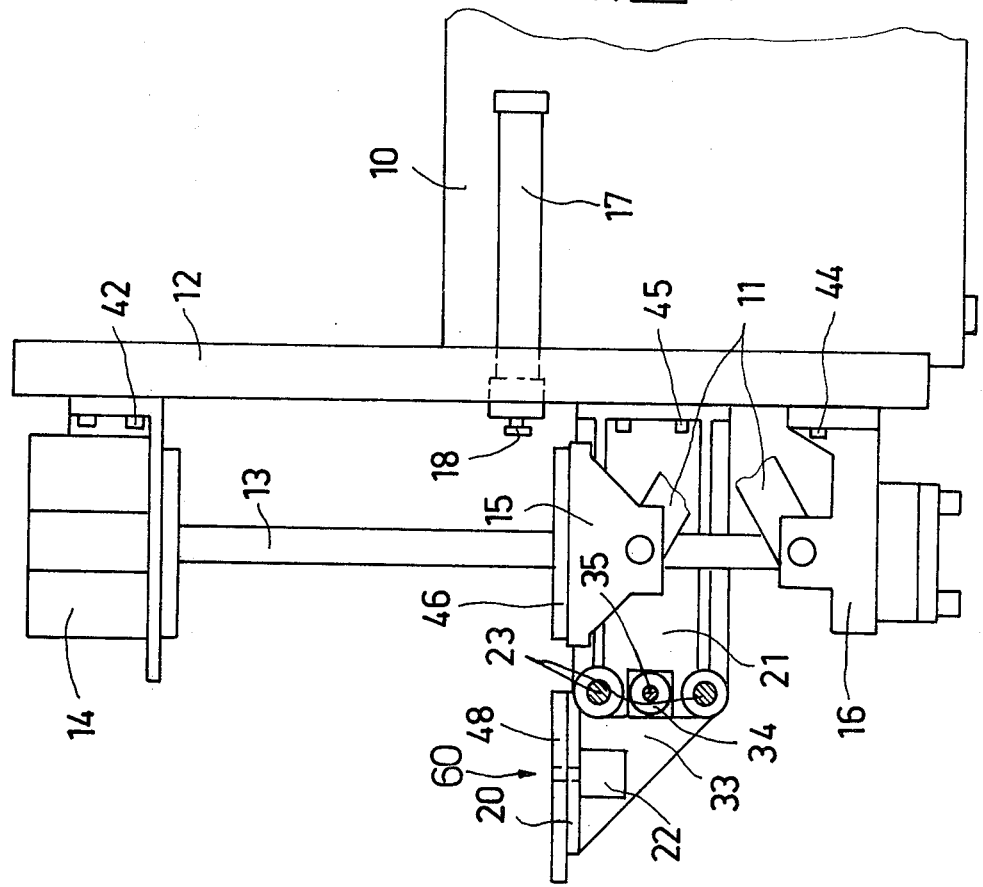
FIG. 2 shows the die closing unit and transfer mechanism of FIG. 1 in an elevational side view.

Referring to the drawings, a first embodiment of the invention is shown and illustrated in FIGS. 1–4 thereof. In FIGS. 1 and 2 can be seen the front portion of a block-shaped machine base 10 of an injection molding machine, on the front face of which are mounted two laterally spaced mounting rails 12 extending vertically a distance above the machine base 10. Each mounting rail 12 has a longitudinal T-groove 24 whose cross section can be seen in FIG. 3. Suitable clamping blocks 56 engaging the shoulders 55 of this T-groove cooperate with mounting bolts 42... 45, thereby adjustably clamping to the mounting rail 12 various component parts of a die closing unit: a stationary die carrier 14 arranged near the upper ends of the mounting rails 12, a crosspiece support 19 for a hydraulic shifting cylinder 17, a pair of cantilever arms 21 for a die table 33, and a lower thrust stock 16 for the die closing unit. A changeover from one type of injection molding die to another, for instance, may require vertical repositioning of the component parts along the mounting rails 12.

The die closing unit itself is of the knee-linkage type, having a movable die carrier 15, guided on a pair of vertical tie rods 13 which extend between the upper, stationary die carrier and a lower, likewise stationary thrust stock 16. The closing motion and closing pressure on the movable die carrier 15 are produced by a hydraulic cylinder unit engaging the knee linkages 11 of which only the connecting ends are shown. (A complete knee-linkage type closing unit is disclosed, for example in U.S. Pat. No. 3,015,131.)

As can best be seen in FIGS. 1 and 3, the die closing unit is flanked on both sides by a cantilever arm 21 extending horizontally from the mounting rail 12 to a point beyond the path of the movable die carrier 15. A pair of vertically spaced guide rods 23, extending between the cantilever arms 21, carries a table 33 (FIG. 2) with a horizontal transfer platen 20 arranged on top of it. The table 33 and transfer platen 6 are movable horizontally along the guide rods 23, under the action of a table drive cylinder 34, whose piston rod 35 is attached to one of the cantilever arms 21, while its cylinder housing is solidary with the table 33.

Referring to FIGS. 3 and 4, it can be seen that the horizontal transfer platen 20 is adapted for carrying two substantially identical transfer sections of an injection molding die - the other section, or sections, of the die being conventional and therefore not illustrated in the drawing - the horizontal motion of the table 33 being such that one or the other of the two transfer sections 25 and 26, respectively, can be placed in alignment with the movable die carrier 15 (FIG. 3). Each transfer section is retained laterally between a pair of guide profiles 47 or 48, respectively, oriented perpendicularly to the guide rods 23 of the platen table 33. Thus, the two transfer sections 25 and 26, are alternatingly movable between two loading stations which are laterally offset from the die closing unit. Both stations on the transfer platen 20 are equipped with ejection devices 22. The movable die carrier 15, facing the transfer platen in the transfer station, carries matching guide profiles 46, so that a transfer section can be readily shifted from the transfer platen 20 to the die carrier 15, and vice versa. The position occupied by the transfer section of the injection molding die on the movable die carrier 15, following such a shifting motion will be referred to hereinafter as the closing station.

The motion for shifting the transfer section of the die from the transfer station on the platen 20 to the closing station on the die carrier 15 is obtained by means of a hydraulic shifting cylinder 17 whose piston rod 36 carries a connecting collar 18 engaging an angled T-groove arranged in a block-shaped extension 27 of the transfer section. This T-groove, having a horizontal laterally open groove portion 29 and a vertical downwardly open groove portion 30, allows for the disengagement of the connecting collar 18 from the transfer section, when the latter is being carried upwardly on the movable die carrier 15 during the subsequent closing motion of the die closing unit. Similarly, when the movable die carrier returns to its open position, it automatically re-engages the transfer section of the die over the connecting collar 18 of the shifting cylinder 17, which then pushes the transfer section into the transfer station on the platen 20. In that position, the table 33 is moved from one side to the other, along the arrow A in FIG. 3, as the connecting collar 18 of the shifting cylinder 17 is disengaged from the transfer section 25 and engaged with the transfer section 26 which carries a matching extension 28 with horizontal and vertical T-groove portions 31 and 32, respectively. The motion of the transfer platen 30 from one side to the other thus produces a shift of the transfer section 25 from the transfer station to its loading station and a simultaneous shift of the other transfer section 26 from its loading station to the transfer station. This transfer section can now be shifted to the closing station on the die carrier 15.

The hydraulic cylinders 34 and 37 which generate these transfer motions are double-acting cylinders, being supplied through hydraulic lines 41/42 and 38/39, respectively, the pressurization of their respective pistons 40 and 37 being timed by means of suitable hydraulic controls (not shown).

As can now readily be understood from FIGS. 3 and 4, the die closing unit and transfer mechanism illustrated therein permit the simultaneous placement of one or more insert parts into one transfer section of the die, while another identical transfer section is involved in an injection cycle, forming part of the closed injection molding die. The arrangement shown features two loading stations arranged on opposite sides of a central transfer station facing the movable die carrier 15. Both loading stations are readily accessible to an operator for the alternating placement of insert parts into the transfer sections 25 and 26, as they arrive in their respective loading stations.

FIG. 3 clearly shows that the table 33 and transfer platen 20 are supported independently of the die closing unit itself and are therefore not effected by the opening and closing motions of the latter. For this reason, it is possible to use a comparatively light-weight table and table drive, thereby increasing the operating speed of the transfer mechanism.

It should be understood that the embodiment of FIGS. 1–4 also lends itself for the use with other than a knee-linkage type die closing unit, and that the lower one of the die carriers need not always be the movable one. Thus, one could modify the embodiment just described, by positioning the stationary die carrier so as to face upwardly at the closing station and by arranging the movable die carrier at a distance above it.

Figure 5:
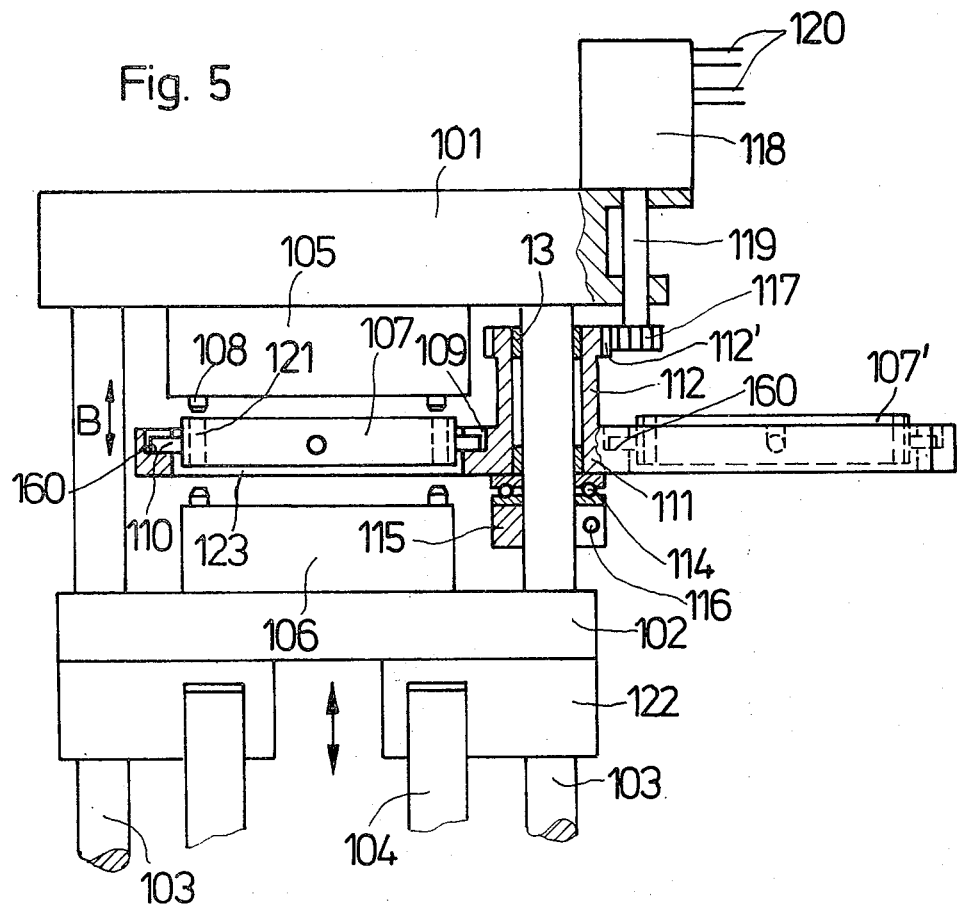
FIG. 5 shows in an elevational front view a second embodiment of the invention, featuring a rotatable transfer platen.
Figure 6:
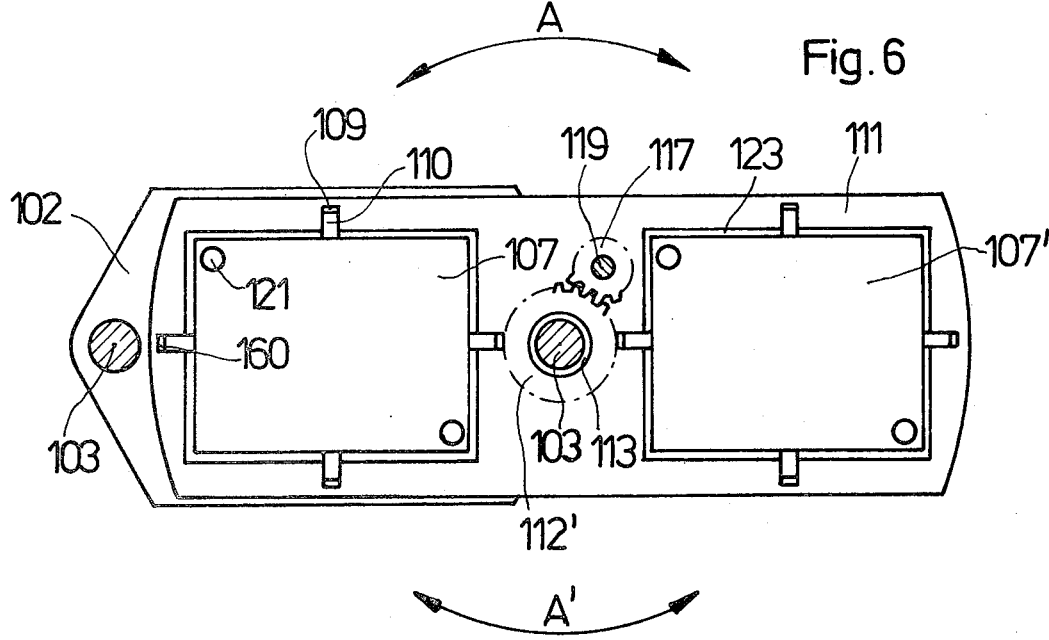
FIG. 6 shows the embodiment of FIG. 5 in a plan view.

A second embodiment of the invention is illustrated in FIGS. 5 and 6, where only the upper and lower die carriers 101 and 102 of the die closing unit are shown, while the die closing drive is again illustrated only partially by showing the end portions 104 of a knee-linkage engaging two bearing blocks 122 attached to the movable die carrier 102. Two spaced vertical tie rods 103 serve again as guides for the movable die carrier 102.

In this case, however, the transfer section of the injection molding die is an intermediate section 107, adapted to cooperate with a matching upper die section 105 attached to the stationary die carrier 101 and a matching lower die section 106 attached to the movable die carrier 102. Several of these transfer sections 107 are arranged on a horizontal turn table or rotary platen 111, where the transfer sections 107 and 107' occupy matching apertures 123 in the platen 111. This rotary transfer platen 111 uses one of the tie rods 103 as a journal support, engaging the latter by means of suitable bushings 13, A thrust bearing 114, supported on a vertically adjustable clamping flange 115, carries the entire rotary platen and its transfer sections. A hub 112 extending vertically from the platen 111 carries a gear 112' which is engaged by the drive pinion 117 of a hydraulic drive motor 118. The latter is mounted on the stationary die carrier 101.

As the drawing illustrates, the two transfer sections 107 and 107' are again alternatingly movable between a loading station situated outside the die closing unit and a transfer station associated with the die closing unit. In FIG. 5, the transfer section 107 is shown to be situated in the transfer station, being still supported by the rotary platen 111. For this purpose, each transfer section has four supporting noses 110 engaging matching guide recesses 109 of the platen 111, the noses resting on the bottom surfaces 160 of the recesses 109.

As the movable die carrier 102 and the lower die section 106 move upwardly in their closing motion, the die section 106 engages the transfer section 107 from underneath, lifting it against the stationary die section 108, while the transfer section 107 is guided vertically by its supporting noses 110 engaging the guide recesses 109. The three die sections are further centered with respect to each other by means of two centering bores 121 arranged in the transfer section 107 and cooperating short centering pins 108 extending from the upper and lower die sections 107 and 106, respectively.

In the fully closed position of the die closing unit, the transfer section 107 is thus no longer supported by the rotary transfer platen 111, so that the latter is not effected by the closing pressure exerted on the injection molding die.

As in the previously described embodiment, the transfer sections 107 and 107' are again alternatingly moved between a loading station and a transfer station, from where the transfer section is moved to its closing station in a direction perpendicular to the movement of the transfer platen. In this case, the shifting movement from the transfer station, in which the transfer section is still carried by the platen, to the closing station, is effected by the movable die carrier itself, the closing station being here also the closed position of the injection molding die. As the die is opened through a downward movement of the movable die carrier 102, the transfer section 107 is again automatically deposited on the rotary transfer table 111 and the latter can now be rotated 180 degrees, thereby moving the transfer section 107' into the transfer station, while bringing the transfer section 107 into the loading station. Here, the molded article is removed and a new insert part, or parts, is placed into the transfer section of the die.

Although the embodiment illustrated and described in connection with FIGS. 5 and 6 features only two transfer sections 107 and 107', it will be readily understood that a larger rotary transfer platen with three or more transfer sections arranged thereon could be provided if desired. The latter would be the case, for instance, in a situation where the placement of the insert parts requires considerable time. The two-position rotary platen of FIGS. 5 and 6 may be arranged for reciprocation along a semi-circle, or its drive may be arranged for an indexing motion involving consecutive half-turn movements.

An essential characteristic of both embodiments is the fact that the transfer platen carries the transfer section of the injection molding die on guides which are located outside the path of the movable die carrier and which are oriented for a shifting motion of the transfer section from the transfer station to the closing station in a direction which is perpendicular to the transfer motion from the loading station to the transfer station. It is the shifting motion from the transfer station to the closing station which removes the transfer section from the carrying engagement with the transfer platen, thereby isolating the latter from the closing pressure of the die closing unit. While the shifting motion requires a special shifting drive in the first embodiment (FIGS. 1–4), it is conveniently combined with the die closing motion in the second embodiment (FIGS. 5 and 6), where the lower die section 106 simple lifts the transfer section 107 from the transfer platen 111.

It should be understood, of course, that the foregoing disclosure describes only preferred embodiments of the invention and that it is intended to cover all changes and modifications of these examples of the invention which fall within the scope of the appended claims.

I claim the following:

1. In an injection molding machine specially adapted for producing injection molded articles with insert parts, such as threaded studs, for example, by at least partially embedding the latter in the articles, and where the injection molding die includes for this purpose a special transfer section of which the machine carries at least two substantially identical ones, which sections are alternatingly removable from the open die for the placement of one or more insert parts into a removed transfer section, as another transfer section forms part of the closed injection molding die and an article is being injection molded therein; in said machine, a die closing unit and die transfer mechanism comprising in combination:

a stationary die carrier mounted solidary with the base of the machine;

a movable die carrier arranged at a vertical distance from the stationary die carrier, in vertical alignment therewith;

means for guiding the movable die carrier for a vertical closing motion toward the stationary die carrier;

means for forcibly moving the movable die carrier against the stationary die carrier, thereby closing the die;

an injection molding die including, as parts thereof, a stationary die section attached to the stationary die carrier, and a movable die section engageable by the movable die carrier for closing against the stationary die section; the lower one of the two die sections being constituted, at least in part, by several substantially identical interchangeable transfer sections;

a transfer platen adapted for carrying and horizontally moving the transfer sections of the die between a loading station located outside the path of the movable die carrier and a transfer station located in the immediate vicinity of the movable die carrier; and means for moving the transfer platen horizontally for alternating movement of the transfer sections between said loading and transfer stations; and wherein the transfer platen includes means for guiding each transfer section from a position in its transfer station to a position in an adjacent closing station defined by said lower die carrier, where the weight of the transfer section is no longer carried by the platen, but by the movable die carrier; said guide means being located outside the path of the movable die carrier and oriented for a movement of the transfer sections substantially perpendicular to its movement between said loading and transfer stations; and the die transfer mechansim further includes means associated with the closing station for moving a transfer section along its guide means between said transfer station and said closing station.

2. A die closing unit and die transfer mechanism as defined in claim 1, wherein the transfer sections are two in number;

the transfer platen has arranged thereon two emplacements for receiving thereon both transfer sections side-by-side, at a spacing representing the horizontal distance between a loading station and the transfer station;

the transfer platen moving means includes a transfer table carried by horizontal guide elements for horizontal straight-line movement over a distance corresponding to the spacing between the two transfer section emplacements on the platen, in the direction determined by said emplacements, so that the transfer sections are alternatingly movable between a central transfer station, occupiable by either transfer section, and two loading stations located on opposite sides of the central transfer station;

the closing station is located on the same level as the central transfer station and in vertical alignment with the two die carriers; and said transfer section guide means between the closing station and the transfer station extends perpendicularly to the guide elements of the transfer table, meaning that the two transfer sections are movable along L-shaped paths, of which one branch is common to both sections.

3. A die closing unit and die transfer mechanism as defined in claim 2, wherein the die carrier which is associated with the closing station includes a horizontal straight-line guide extending from the closing station in the direction of the transfer station; and the transfer section guide means of the transfer platen includes, in each of its two transfer section emplacements, a similar horizontal straight-line guide which is in alignment with said guide in the closing station, when the transfer section emplacement is located in the transfer station.

4. A die closing unit and die transfer mechanism as defined in claim 3, wherein said transfer section moving means of the closing station includes a shifting cylinder with a piston rod adapted to engage a transfer section and to move it from the transfer station to the closing station, and vice versa, along said aligned straight-line guides.

5. A die closing unit and die transfer mechanism as defined in claim 3, wherein the transfer sections of the die are substantially rectangular in outline; and the straight-line guides of the transfer section emplacements and of the closing station are in each case a pair of spaced parallel guide profiles engaging matching guide grooves on opposite sides of each transfer section.

6. A die closing unit and die transfer mechanism as defined in claim 3, wherein the die carrier which is associated with the closing station is the movable die carrier, its open position being the one that determines the closing station;

the two transfer sections of the die constitute the movable die section; and the stationary die carrier and its stationary die section are arranged vertically above the movable die carrier and movable die section.

7. A die closing unit and die transfer mechanism as defined in claim 6, wherein each transfer section is moved vertically upwardly from its closing station, by virtue of its association with the movable die carrier;

the transfer section moving means includes a horizontally moving driving rod extending above the closing station in the direction of the transfer station, with a connection collar at its extremity;

each transfer section includes an angled T-groove engageable by said connecting collar, the angled T-groove having a vertical groove portion for entry and exit of the connecting collar during the vertical closing motion of the die, and a horizontal groove portion for entry and exit of the connecting collar during the horizontal motion of the transfer section between the loading and transfer stations.

8. A die closing unit and die transfer mechanism as defined in claim 6, wherein the die carrier moving means includes a stationary thrust stock arranged a distance below the movable die carrier, and a knee-linkage-type die closing drive of which one link is attached to the thrust stock and the other link is attached to the movable die carrier.

9. A die closing unit and die transfer mechanism as defined in claim 8, further comprising a pair of laterally spaced vertically oriented mounting rails fixedly attached to the base of the machine; and wherein the stationary die carrier is vertically adjustably clamped to the mounting rails near the upper end thereof;

the thrust stock is similarly adjustably clamped to the mounting rails near the lower end thereof;

the transfer section moving means of the closing station includes a horizontally aligned shifting cylinder and a crosspiece support carrying the shifting cylinder, said support being likewise adjustably clamped to the mounting rails;

the transfer platen moving means further includes a pair of laterally spaced cantilever arms carrying between them said guide elements for the transfer table, the cantilever arms being likewise adjustably clamped to the two mounting rails, respectively.

10. A die closing unit and die transfer mechanism as defined in claim 9, wherein the guide elements for the transfer table are two vertically spaced guide rods extending horizontally between the cantilever arms; and the transfer platen moving means further includes a table drive cylinder extending between the transfer table and one of the cantilever arms.

11. A die closing unit and die transfer mechanism as defined in claim 1, wherein the die carrier which is associated with the closing station is the movable die carrier;

the movable die, in addition to including said several transfer sections, further includes a movable die section which is attached to the movable die carrier; and the stationary die carrier and its associated stationary die are arranged vertically above the closing station and the movable die carrier.

12. A die closing unit and die transfer mechanism as defined in claim 11, wherein the transfer platen is a rotary platen, being journalled for rotation around a vertical axis spaced a distance from the movable die carrier and its closing station;

the rotary transfer platen includes at least two transfer section emplacements, located at a radius from said axis equal to the distance between the latter and the closing station;

the transfer section emplacements on the rotary platen are apertures in the platen allowing for vertical movement therethrough of at least a portion of the movable die;

the transfer platen moving means includes a rotary drive for the platen adapted for alternatingly moving a transfer section received inside its emplacement aperture from a loading station to a transfer station located in vertical alignment with the movable die, underneath a likewise vertically aligned closing station; and the movable die and its moving means constitute said means for moving a transfer section between the transfer station and the closing station above it, while they execute the closing motion of the die.

13. A die closing unit and die transfer mechanism as defined in claim 12, wherein the transfer section guide means between the transfer station and the closing station includes vertically extending, upwardly open guide recesses in the platen adjacent its emplacement apertures, and matching supporting noses extending laterally from each transfer section; and said guide recesses have bottom faces supporting thereon the transfer section by engaging its supporting noses.

14. A die closing unit and die transfer mechanism as defined in claim 12, wherein the means for guiding the movable die carrier includes a pair of laterally spaced vertical tie rods extending vertically on opposite sides of the die; and one of said tie rods serves as a bearing support and rotational axis for the rotary platen, having a thrust bearing vertically adjustably clamped to the tie rod.

15. A die closing unit and die transfer mechanism as defined in claim 14, wherein the rotary drive for the platen includes a central hub surrounding said supporting tie rod, a gear solidary with said hub, and a hydraulic motor driving said gear by means of a pinion; and the hydraulic motor is mounted on a lateral extension of the stationary die carrier.

16. A die closing unit and die transfer mechanism as defined in claim 11, wherein the number of transfer section emplacements on the rotary platen and the number of transfer section in the die is two, the transfer section emplacements on the rotary platen being located diametrally opposite each other.

* * * * *